US012741475B2

(12) United States Patent
Yamakuchi et al.

(10) Patent No.: US 12,741,475 B2
(45) Date of Patent: Sep. 22, 2026

(54) ASSEMBLY METHOD FOR LIQUID DISCHARGE DEVICE

(71) Applicant: KYOCERA CORPORATION, Kyoto (JP)

(72) Inventors: Nobuaki Yamakuchi, Kirishima (JP); Kenko Gejima, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 158 days.

(21) Appl. No.: 18/552,900

(22) PCT Filed: Mar. 23, 2022

(86) PCT No.: PCT/JP2022/013711
§ 371 (c)(1),
(2) Date: Sep. 28, 2023

(87) PCT Pub. No.: WO2022/210211
PCT Pub. Date: Oct. 6, 2022

(65) Prior Publication Data

US 2024/0190150 A1 Jun. 13, 2024

(30) Foreign Application Priority Data

Mar. 31, 2021 (JP) ................................ 2021-061817

(51) Int. Cl.
*B41J 25/34* (2006.01)
*B41J 2/165* (2006.01)
*B41J 15/06* (2006.01)

(52) U.S. Cl.
CPC ........... *B41J 25/34* (2013.01); *B41J 2/16508* (2013.01); *B41J 2/16585* (2013.01); *B41J 15/06* (2013.01); *Y10T 29/49401* (2015.01)

(58) Field of Classification Search
CPC .... B41J 2/16508; B41J 2/16585; B41J 25/34; B41J 15/06; Y10T 29/49401
See application file for complete search history.

(56) References Cited

U.S. PATENT DOCUMENTS 8,162,434 B2 4/2012 Chikamoto et al.
2008/0284814 A1 11/2008 Chikamoto et al.
(Continued)

FOREIGN PATENT DOCUMENTS

CN 111070892 A 4/2020
JP 2008074038 A 4/2008
(Continued)

OTHER PUBLICATIONS

Pollák et al, "The structural design of 3D print head and execution of printing via the robotic arm ABB IRB 140", 2018 5th International Conference on Industrial Engineering and Applications (ICIEA), Singapore, 2018, pp. 194-198. (Year: 2018).*
(Continued)

*Primary Examiner* — A. Dexter Tugbang
(74) *Attorney, Agent, or Firm* — HAUPTMAN HAM, LLP

(57) ABSTRACT

An assembly method for a liquid discharge device includes mounting a cap to a head that has a first surface configured to discharge liquid, the cap covering the first surface; fixing the head to which the cap is mounted to a holding portion; and removing the cap from the head that is fixed to the holding portion. The cap is fixed to the head using a first fixing member that is removable. The head is fixed to the holding portion using a second fixing member. The first fixing member and the second fixing member are provided toward the same side along a thickness direction of the head. The first fixing member is removable in a direction away from the first surface.

6 Claims, 9 Drawing Sheets

(56) References Cited

U.S. PATENT DOCUMENTS

| | | | | |
|---|---|---|---|---|
| 2009/0201349 | A1 * | 8/2009 | Wazana | Y10T 29/49401 399/109 |
| 2017/0217185 | A1 * | 8/2017 | Wagner | B41J 2/16508 |
| 2020/0122467 | A1 | 4/2020 | Fukunaga | |

FOREIGN PATENT DOCUMENTS

| | | | | |
|---|---|---|---|---|
| JP | 2008229932 | A | | 10/2008 |
| JP | 2009-066909 | A | | 4/2009 |
| JP | 2009184210 | A | | 8/2009 |
| JP | 2016175358 | A | | 10/2016 |
| JP | 2018-176717 | A | | 11/2018 |
| JP | 2019130809 | A | * | 8/2019 |
| JP | 7447355 | B2 | | 3/2024 |

OTHER PUBLICATIONS

International Search Report in PCT Application No. PCT/JP2022/013711 mailed Jun. 14, 2022, 2pp.

* cited by examiner

ASSEMBLY METHOD FOR LIQUID DISCHARGE DEVICE

CROSS-REFERENCE TO RELATED APPLICATIONS

This application is national stage application of International Application No. PCT/JP2022/013711, filed on Mar. 23, 2022, which designates the United States, and which claims the benefit of priority from Japanese Patent Application No. 2021-061817, filed on Mar. 31, 2021.

TECHNICAL FIELD

Embodiments of the disclosure relate to a liquid discharge device and an assembly method for the liquid discharge device.

BACKGROUND OF INVENTION

Inkjet printers and inkjet plotters utilizing an inkjet recording method are known as liquid discharge devices. A liquid discharge head for discharging liquid is mounted in the liquid discharge device using such an inkjet method.

Such a liquid discharge head includes a known liquid discharge head in which a liquid discharge surface is protected by a cap and which performs conveyance or transport (for example, see Patent Literatures 1 and 2).

CITATION LIST

Patent Literature

Patent Document 1: JP 2008-74038 A
Patent Document 2: JP 2009-184210 A

SUMMARY

In one aspect of an embodiment, a liquid discharge device includes a head, a holding portion, a cap, and a second fixing member. The head includes a first surface configured to discharge liquid. The holding portion holds the head. The cap is fixed to the head using a removable first fixing member and covers the first surface. The second fixing member fixes the head and the holding portion.

DESCRIPTION OF EMBODIMENTS

Embodiments of a liquid discharge device and an assembly method for the liquid discharge device disclosed in the present application will be described in detail below with reference to the accompanying drawings. The present invention is not limited by the following embodiments.

Printer Configuration

Figure 1:
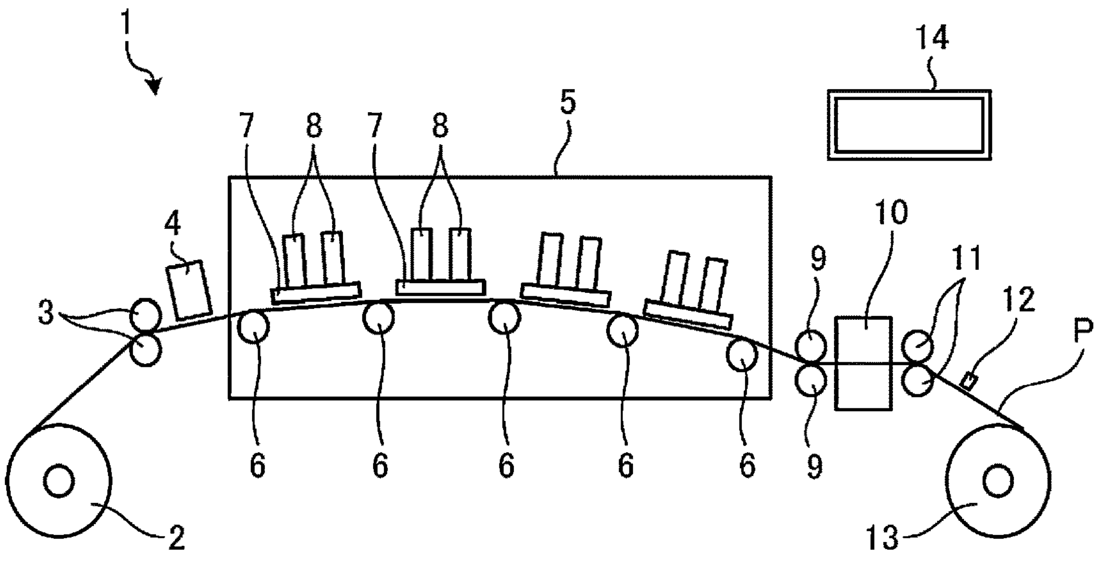
FIG. 1 is an explanatory view (1) of a liquid discharge device according to an embodiment.
Figure 2:
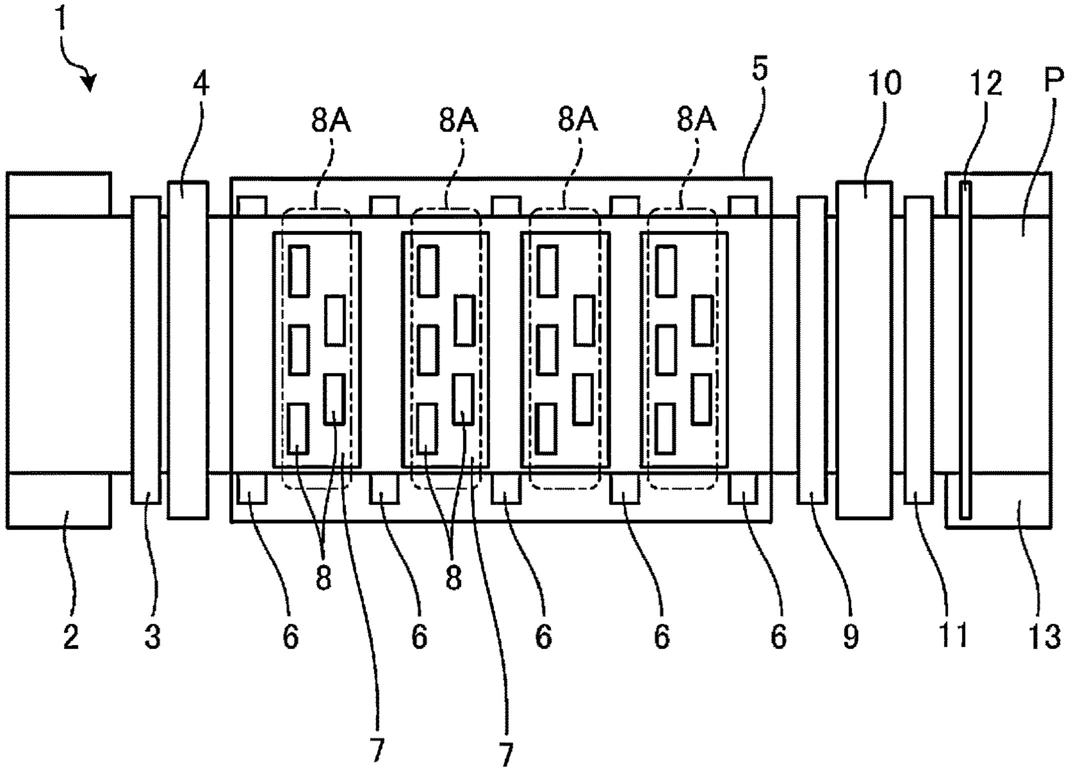
FIG. 2 is an explanatory view (2) of the liquid discharge device according to an embodiment.

First, with reference to FIG. 1 and FIG. 2, a description will be given of an overview of a printer serving as an example of a liquid discharge device 1 according to an embodiment. FIGS. 1 and 2 are explanatory views of the printer according to the embodiment. Specifically, FIG. 1 is a schematic side view of the printer and FIG. 2 is a schematic plan view of the printer. The printer according to the embodiment is, for example, a color inkjet printer.

As illustrated in FIG. 1, the liquid discharge device 1 includes a paper feed roller 2, guide rollers 3, an applicator 4, a head case 5, a plurality of transport rollers 6, a plurality of frames 7, a plurality of heads 8, transport rollers 9, a dryer 10, transport rollers 11, a sensor 12, and a collection roller 13. The transport rollers 6 are examples of a transporter.

The liquid discharge device 1 further includes a controller 14 that controls the paper feed roller 2, the guide rollers 3, the applicator 4, the head case 5, the plurality of transport rollers 6, the plurality of frames 7, the plurality of heads 8, the transport rollers 9, the dryer 10, the transport rollers 11, the sensor 12, and the collection roller 13.

By landing droplets on a printing sheet P, the liquid discharge device 1 records images and characters on the printing sheet P. The printing sheet P is an example of a recording medium. The printing sheet P is rolled on the paper feed roller 2 prior to use. The liquid discharge device 1 transports the printing sheet P from the paper feed roller 2 to the inside of the head case 5 via the guide rollers 3 and the applicator 4.

The applicator 4 uniformly applies a coating agent over the printing sheet P. With a surface treatment thus performed on the printing sheet P, the printing quality of the liquid discharge device 1 can be improved.

The head case 5 houses the plurality of transport rollers 6, the plurality of frames 7, and the plurality of heads 8. The inside of the head case 5 is formed with a space separated from the outside except for a part connected to the outside such as parts where the printing sheet P enters and exits.

As required, the controller 14 controls at least one of controllable factors of the internal space of the head case 5, such as temperature, humidity, and air pressure. The transport rollers 6 transport the printing sheet P to the vicinity of the heads 8, inside the head case 5.

The frames 7 are rectangular flat plates, and are positioned above and close to the printing sheet P transported by the transport rollers 6. As illustrated in FIG. 2, the frames 7 are positioned such that the longitudinal direction of the frames 7 is orthogonal to the transport direction of the printing sheet P. Furthermore, the plurality of (e.g., four) frames 7 are located inside the head case 5 along the transport direction of the printing sheet P.

Liquid, for example, ink, is supplied to the heads 8 from a liquid tank (not illustrated). The heads 8 are liquid discharge heads that discharge the liquid supplied from the liquid tank.

The controller 14 controls the heads 8 based on data of images, characters, or the like to discharge the liquid toward the printing sheet P. The distance between each head 8 and the printing sheet P is, for example, approximately from 0.5 to 20 mm.

The heads 8 are fixed to the frames 7. The heads 8 are positioned such that the longitudinal direction of the heads 8 is orthogonal to the transport direction of the printing sheet P.

That is, the liquid discharge device 1 according to the embodiment is a so-called line printer in which the heads 8 are fixed inside the liquid discharge device 1. Note that the liquid discharge device 1 according to the embodiment is not limited to a line printer and may also be a so-called serial printer.

The serial printer is a printer employing a method of alternately performing operations of recording while moving the heads 8 in a manner such as reciprocation in a direction intersecting (e.g., substantially orthogonal to) the transport direction of the printing sheet P, and transporting the printing sheet P.

As illustrated in FIG. 2, a plurality of (e.g., five) heads 8 are fixed to one frame 7. FIG. 2 illustrates an example in which three heads 8 are located on the forward side and two heads 8 are located on the rear side, in the transport direction of the printing sheet P. Further, the heads 8 are positioned without their centers overlapping with each other in the transport direction of the printing sheet.

The plurality of heads 8 located in one frame 7 form a head group 8A. Four head groups 8A are positioned along the transport direction of the printing sheet P. The heads 8 belonging to the same head group 8A are supplied with ink of the same color. As a result, the liquid discharge device 1 can perform printing with four colors of ink using the four head groups 8A.

The colors of the ink discharged from the respective head groups 8A are, for example, magenta (M), yellow (Y), cyan (C), and black (K). The controller 14 can print a color image on the printing sheet P by controlling the respective head groups 8A to discharge the plurality of colors of ink onto the printing sheet P.

Note that a surface treatment may be performed on the printing sheet P, by discharging a coating agent from the head 8 onto the printing sheet P.

The number of the heads 8 included in one head group 8A and the number of the head groups 8A mounted in the liquid discharge device 1 can be changed as appropriate in accordance with printing targets and printing conditions. For example, when the color to be printed on the printing sheet P is a single color and the range of the printing can be covered by a single head 8, only a single head 8 may be mounted in the liquid discharge device 1.

The printing sheet P thus subjected to the printing process inside the head case 5 is transported by the transport rollers 9 to the outside of the head case 5, and passes through the inside of the dryer 10. The dryer 10 dries the printing sheet P after the printing process. The printing sheet P thus dried by the dryer 10 is transported by the transport rollers 11 and then collected by the collection roller 13.

In the liquid discharge device 1, drying the printing sheet P with the dryer 10 can suppress bonding or rubbing of undried liquid between the printing sheets P overlapped with each other and rolled at the collection roller 13.

The sensor 12 includes a position sensor, a speed sensor, a temperature sensor, or the like. Based on the information from the sensor 12, the controller 14 can determine the state of each portion of the liquid discharge device 1 and control each portion of the liquid discharge device 1.

In the liquid discharge device 1 described above, the printing sheet P is the printing target (i.e., the recording medium), but the printing target in the liquid discharge device 1 is not limited to the printing sheet P, and a roll type cloth or the like may be the printing target.

Instead of directly transporting the printing paper P, the liquid discharge device 1 may have a configuration in which the printing sheet P is put on a transport belt and transported. By using the transport belt, the liquid discharge device 1 can perform printing on a sheet of paper, a cut cloth, wood, a tile, or the like as a printing target.

The liquid discharge device 1 may discharge liquid containing electrically conductive particles from the heads 8 to print a wiring pattern or the like of an electronic device. The liquid discharge device 1 may discharge a predetermined amount of liquid chemical agent or liquid containing a chemical agent from the heads 8 onto a reaction vessel or the like to produce chemicals.

The liquid discharge device 1 may also include a cleaner cleaning the heads 8. The cleaner cleans the heads 8 by, for example, a wiping process or a capping process.

The wiping process is, for example, a process of removing liquid attached to the heads 8 by wiping a surface of a side from which liquid is discharged.

The capping process is performed as follows, for example. First, a cap is provided in a manner to cover a first surface 23*a* (see FIG. 3B) of a nozzle plate 23 where a discharge hole is located which is an example of the site from which the liquid is discharged (this process is referred to as capping). As a result, a substantially hermetically sealed space is formed between the first surface 23*a* and the cap. The discharge of liquid is then repeated in such a hermetically sealed space. Consequently, this can remove liquid having a viscosity higher than that in the normal state, foreign matters, or the like that have clogged the discharge hole of the first surface 23*a*.

Note that the liquid discharge device 1 is not limited to a device that transports a printing target (recording medium) as described above, and may be a device that moves an applicator (liquid discharge device) in a state where the printing target is fixed. Such a liquid discharge device 1 may be, for example, a device including a robot arm.

First Embodiment

Configuration of Liquid Discharge Head

Figure 3A:
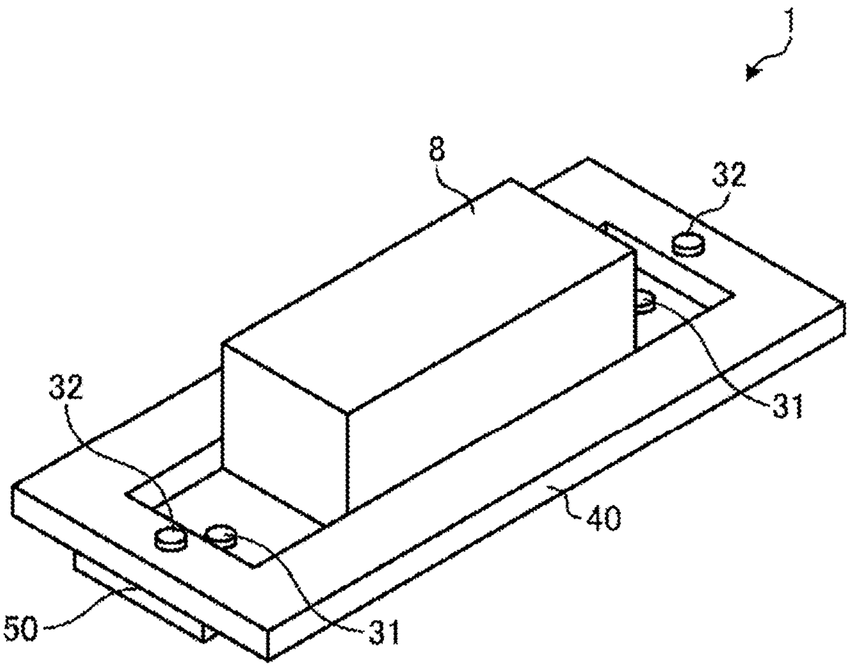
FIG. 3A is a perspective view illustrating a configuration of a main portion of the liquid discharge device according to a first embodiment.
Figure 3B:
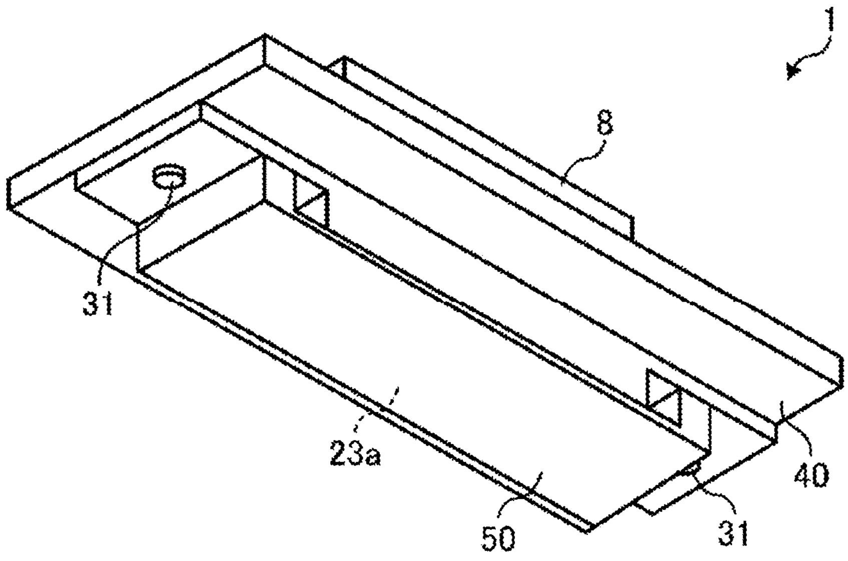
FIG. 3B is a perspective view of the liquid discharge device illustrated in FIG. 3A as viewed from a different direction.

Next, the configuration of the liquid discharge device according to the first embodiment will be described with reference to FIGS. 3A and 3B. FIG. 3A is a perspective view illustrating a configuration of a main portion of the liquid discharge device according to the first embodiment. FIG. 3B is a perspective view of the liquid discharge device illustrated in FIG. 3A as viewed from a different direction.

The liquid discharge device 1 includes a head 8, first fixing members 31, second fixing members 32, a frame 40, and a cap 50. The head 8 includes a first surface 23*a* configured to discharge liquid. The cap 50 is mounted to the head 8 using the first fixing members 31. The head 8 is fixed to the frame 40 using the second fixing members 32.

The material of the frame 40 is, for example, stainless steel or aluminum. The frame 40 is a holding portion that holds the head 8. The frame 40 may be a part of the frame 7 illustrated in FIGS. 1 and 2, or may be a member fixed to the frame 7.

The cap 50 is fixed to the head 8 using the first fixing members 31. The cap 50 protects the first surface 23*a*. The first surface 23*a* is a discharge surface including a discharge hole from which liquid is discharged. The material of the cap 50 may be, for example, metal or resin. When the cap 50 is made of a metal, its material may be, for example, stainless steel or aluminum. When the cap 50 is made of resin, its material may be, for example, thermoplastic resin or thermosetting resin having resistance to the liquid discharged from the first surface 23*a*.

The first fixing members 31 and the second fixing members 32 are, for example, screw members. The first fixing members 31 and the second fixing members 32 illustrated in FIG. 3 are both provided toward the same side along the thickness direction of the head 8. Specifically, when the head 8 is fixed from above the frame 40, the first fixing members 31 are provided from the frame 40 toward the cap 50 side (from above to below), and the second fixing members 32 are also provided from the head 8 toward the frame 40 side (from above to below) in the same or similar direction. According to this configuration, the first fixing members 31 and the second fixing members 32 are mounted in the direction of gravity and assembly of the liquid discharge device 1 is facilitated, thus allowing workability at the time of assembly to improve.

The first fixing members 31 are provided in a detachable manner. Therefore, the cap 50 can be removed from the head 8 by removing the first fixing members 31.

Figure 4:
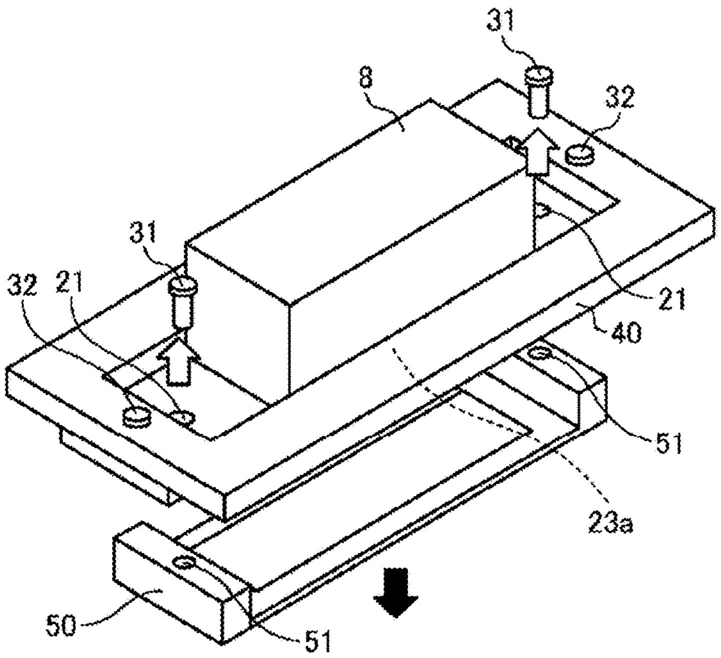
FIG. 4 is a perspective view illustrating a state in which the cap is removed from the liquid discharge device according to the first embodiment.

FIG. 4 is a perspective view illustrating a state in which the cap is removed from the liquid discharge device according to the first embodiment. As illustrated in FIG. 4, the first fixing members 31 are detachably provided in holes 21 penetrating the head 8 and holes 51 provided in the cap 50. The first fixing members 31 can be removed in a direction away from the cap 50. By removing the first fixing members 31 in this manner, in the liquid discharge device 1, the cap 50 can be removed in a state in which the head 8 is fixed to the frame 40. Therefore, workability can be improved, and reliability in assembly can be improved by protecting the first surface 23*a* with the cap 50 until use.

Figure 5:
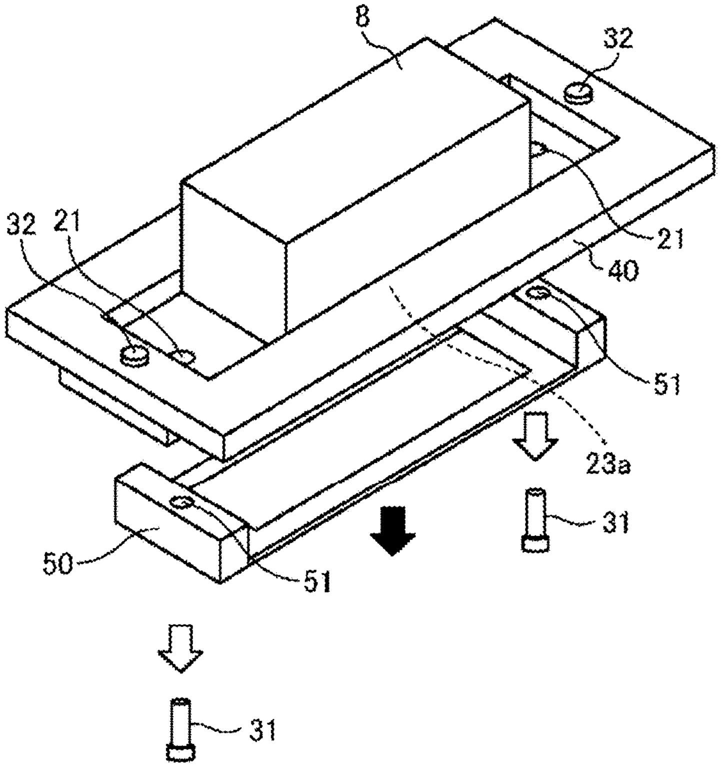
FIG. 5 is a perspective view illustrating a state in which the cap is removed from the liquid discharge device according to a first variation of the first embodiment.

FIG. 5 is a perspective view illustrating a state in which the cap is removed from the liquid discharge device according to the first variation of the first embodiment. As illustrated in FIG. 5, the first fixing members 31 and the second fixing members 32 are provided toward mutually opposite sides along the thickness direction of the head 8. The first fixing members 31 are detachably provided in the holes 21 provided in the head 8 and the holes 51 penetrating the cap 50. Also in such a liquid discharge device 1, the cap 50 can be removed from the head 8 in a state in which the head 8 is fixed to the frame 40 by removing the first fixing members 31. Specifically, when the head 8 is fixed from below the frame 40, the first fixing members 31 are provided from the frame 40 toward the cap 50 side (from above to below), and the second fixing members 32 are provided from the head 8 toward the frame 40 side (from below to above) in a direction opposite to that of the first fixing members 31. According to this configuration as well, the first fixing members 31 and the second fixing members 32 are inserted from an object having a great mass to an object having a less mass, thus improving workability and improving reliability in assembly by protecting the first surface 23*a* with the cap 50 until use.

In the liquid discharge device 1 according to the present variation, the first fixing members 31 can be removed in the same direction as the cap 50, which is a direction away from the first surface 23*a*. Therefore, securing a path for removing the first fixing members 31 separately from a path for removing the cap 50 is not necessary, thus increasing the degree of freedom in design, for example.

Figure 6:
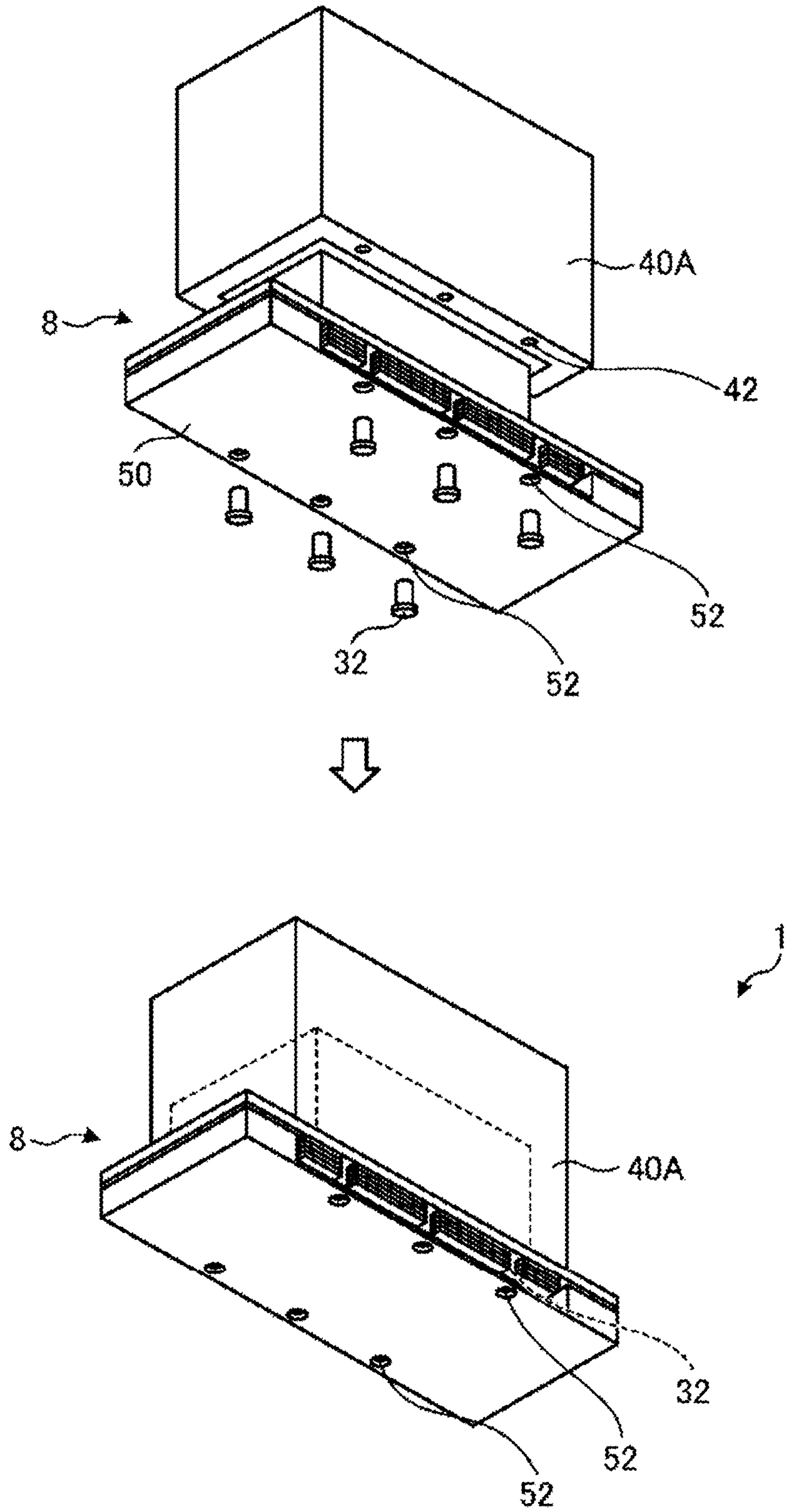
FIG. 6 is a perspective view illustrating an example of the liquid discharge device according to a second variation of the first embodiment.
Figure 7:
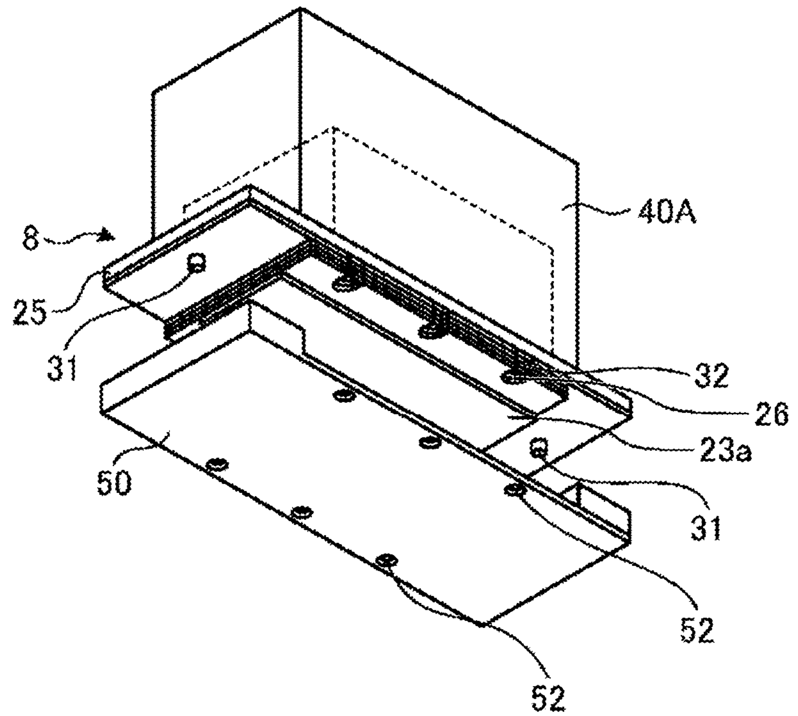
FIG. 7 is a perspective view illustrating a state in which the cap is removed from the liquid discharge device illustrated in FIG. 6.

FIG. 6 is a perspective view illustrating an example of the liquid discharge device according to the second variation of the first embodiment. FIG. 7 is a perspective view illustrating a state in which the cap is removed from the liquid discharge device illustrated in FIG. 6.

The liquid discharge device 1 according to the present variation includes a casing 40A instead of the frame 40. The casing 40A is a holding portion that holds the head 8. The casing 40A has a space for accommodating a part of the head 8 therein. The casing 40A may be, for example, a structure that blocks the internal space from the external space. Such a liquid discharge device 1 is applied to, for example, a coating application in which a volatile liquid is discharged.

As illustrated in FIG. 6, the casing 40A has holes 42 for fixing the head 8 using the second fixing members 32. The cap 50 has penetrating portions 52 at positions corresponding to the holes 42. The penetrating portions 52 are through holes penetrating the cap 50 in the thickness direction of the head 8. The penetrating portions 52 are used not for fixing the cap 50 but for fixing the head 8 to the casing 40A by inserting the second fixing members 32 through the penetrating portions 52. For example, the penetrating portions 52 may be located at an end portion of the cap 50 and may have a shape penetrating the cap 50 in the thickness direction of the head 8, that is, may be a cutout.

FIG. 7 is a perspective view illustrating a state in which the cap is removed from the liquid discharge device illustrated in FIG. 6. The cap 50 can be removed from the head 8 by removing the first fixing members 31 located on the outer side of the first surface 23*a* in the longitudinal direction. The head 8 includes penetrating portions 26 located on the outer side of the first surface 23*a* in the lateral direction. The penetrating portions 26 are used for fixing the head 8 to the casing 40A using the second fixing members 32.

Figure 8:
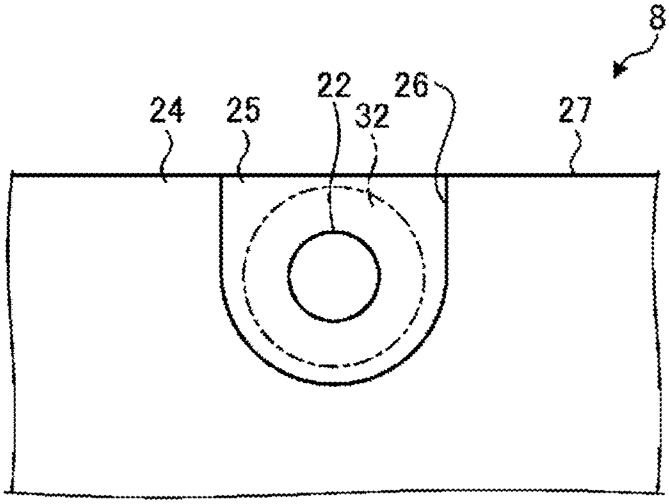
FIG. 8 is a plan view illustrating a vicinity of the second fixing member.
Figure 9:
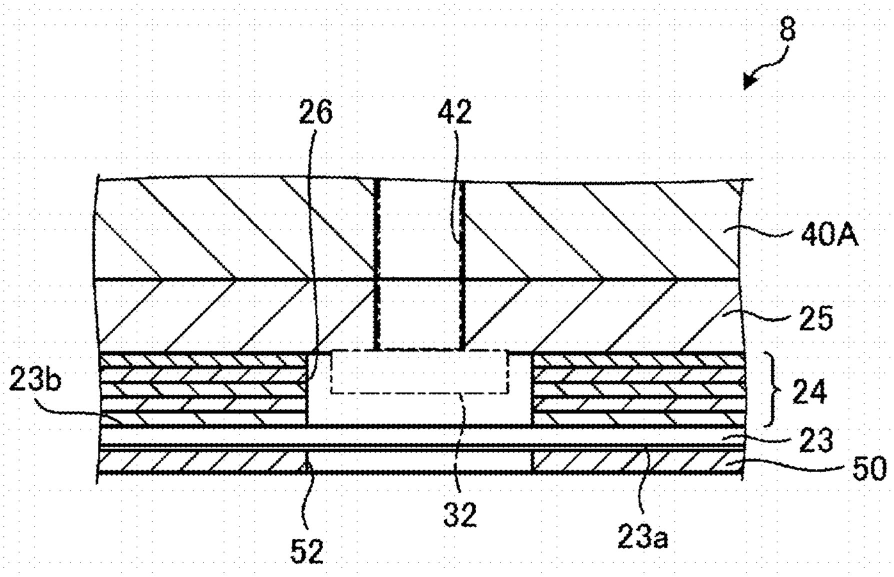
FIG. 9 is a cross-sectional view illustrating the vicinity of the second fixing member.

Here, an example of the shape of the penetrating portions 26 where the second fixing members 32 are located and the vicinity thereof will be described. FIG. 8 is a plan view illustrating the vicinity of the second fixing member. FIG. 9 is a cross-sectional view illustrating the vicinity of the second fixing member. Note that, in FIG. 8, illustration of the cap 50 is omitted.

As illustrated in FIG. 9, the head 8 includes a nozzle plate 23, a channel member 24, and a base plate 25. The nozzle plate 23 includes a first surface 23*a* from which liquid is discharged and a second surface 23*b* facing the first surface 23*a*. The channel member 24 is located on the second surface 23*b* and includes a plurality of reservoir plates layered in the thickness direction of the head 8. The base plate 25 is located on a side opposite to the nozzle plate 23 with the channel member 24 interposed therebetween. The base plate 25 is a member having a greater thickness than each reservoir plate included in the channel member 24. For example, the base plate 25 may be a metal cutting component or a resin molding having high rigidity and strength.

The channel member 24 includes a penetrating portion 26 penetrating the channel member 24 in the thickness direction. As illustrated in FIG. 8, the penetrating portion 26 has a cutout shape facing an end surface 27 of the channel member 24. The penetrating portion 26 is separated from the second fixing member 32 indicated by a chain line, and the second fixing member 32 fixes the head 8 to the casing 40A by fastening the base plate 25 and the casing 40A. Note that the penetrating portion 26 being separated from the second fixing member 32 means that the inner wall of the penetrating portion 26 is not in contact with the second fixing member 32.

Since the penetrating portion 26 is separated from the second fixing member 32, the channel member 24 does not receive a shearing stress caused by mounting of the second fixing member 32. Since each of the reservoir plates constituting the channel member 24 is thinner than the base plate 25, a failure may occur in the discharge performance due to, for example, deformation when the reservoir plate receives stress caused by fastening of the second fixing member 32. On the other hand, according to the head 8 of the present variation, the base plate 25 receives the shearing stress caused by mounting of the second fixing member 32. Since the thickness of the base plate 25 is greater than that of each reservoir plate included in the channel member 24, the base plate 25 is less likely to deform when the second fixing member 32 is mounted. Therefore, according to the liquid ejecting device 1 including the flow channel member 24 having the penetrating portion 26, for example, the durability of the head 8 is improved. Note that the size of the head 8 does not need to be increased more than necessary, which can contribute to the miniaturization of the head 8.

Figure 10:
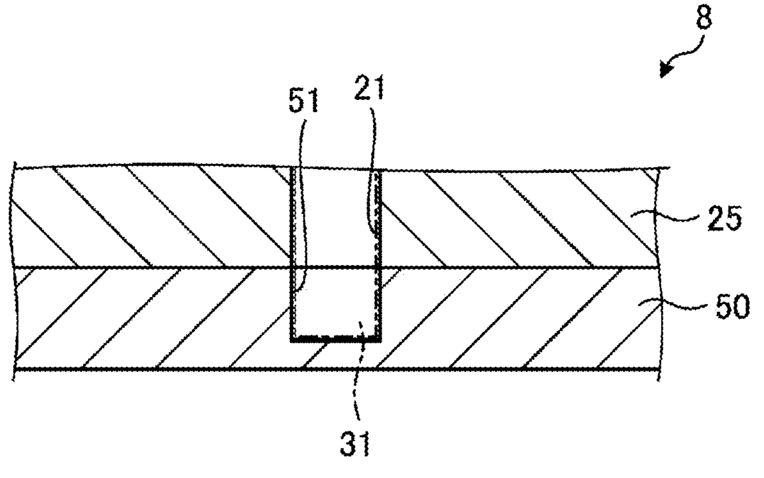
FIG. 10 is a cross-sectional view illustrating a vicinity of the first fixing member.

An example of the shape of the cap 50 where the first fixing member 31 is located and the vicinity thereof will be described. FIG. 10 is a cross-sectional view illustrating the vicinity of the first fixing member.

As illustrated in FIG. 10, the cap 50 includes the hole 51. The base plate 25 has the hole 21 at a position corresponding to the hole 51. The first fixing member 31 is located inside the holes 21 and 51, for example, to detachably fix the base plate 25 and the cap 50. Note that, although FIG. 10 illustrates an example in which the first fixing member 31 is provided from the base plate 25 side, the shapes of the holes 21 and 51 may be changed to provide the first fixing member 31 from the cap 50 side.

Second Embodiment

Figure 11:
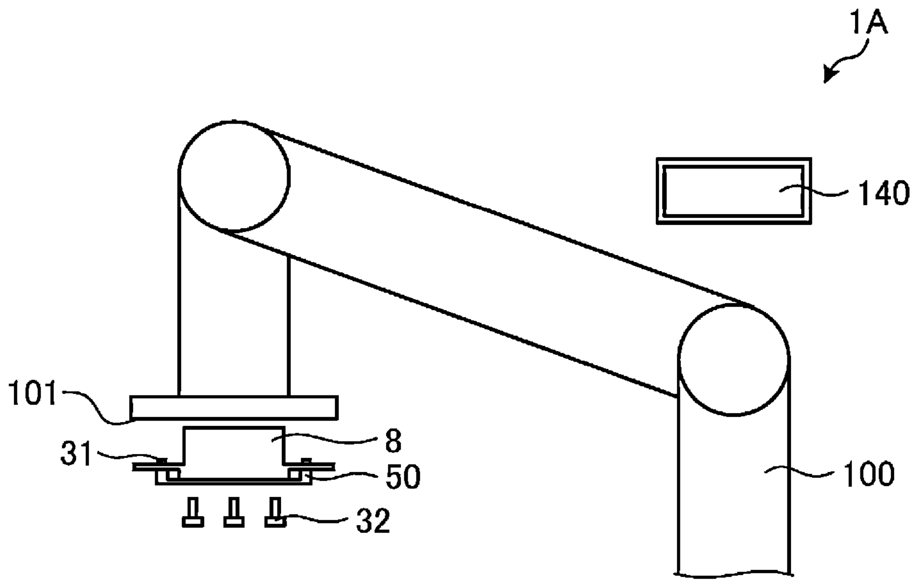
FIG. 11 is a diagram illustrating a configuration of a main portion of the liquid discharge device according to a second embodiment.

FIG. 11 is a diagram illustrating a configuration of a main portion of the liquid discharge device according to the second embodiment. A liquid discharge device 1A illustrated in FIG. 11 includes a robot arm 100 that can be controlled by a controller 140. A holding portion 101 is located at the tip of the robot arm 100.

In the liquid discharge device 1A, the robot arm 100 may be located such that the holding portion 101 faces downward, and the head 8 held by the holding portion 101 may be fixed to the holding portion 101 using the second fixing members 32 directed upward from the bottom side of the head 8. By locating the robot arm 100 and fixing the head 8 in this manner, the first surface 23*a* of the head 8 is protected by the cap 50 until use to improve reliability in assembly also in the liquid discharge device 1A including the robot arm 100.

Figure 12:
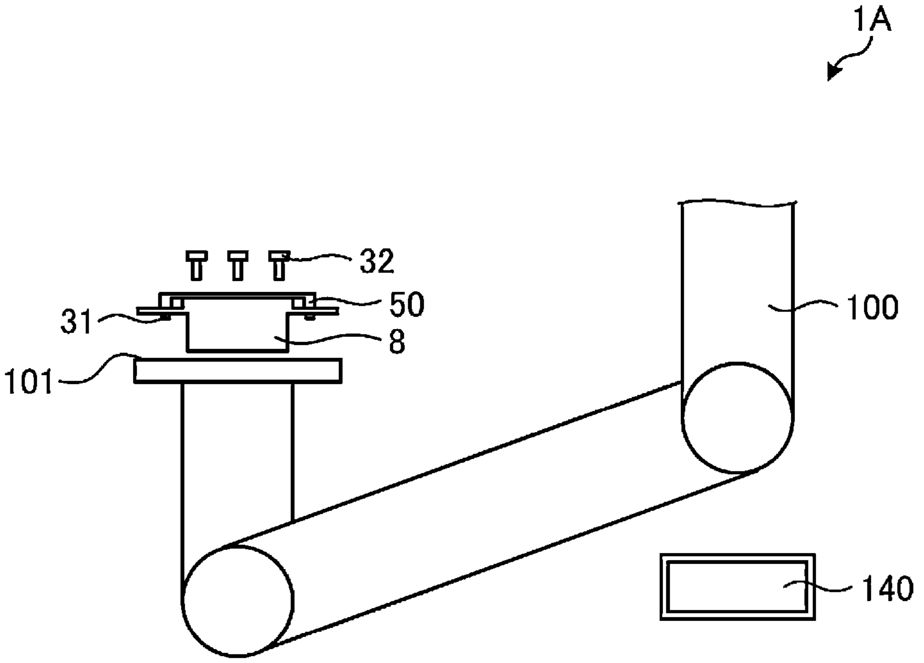
FIG. 12 is a diagram illustrating a configuration of a main portion of the liquid discharge device according to a variation of the second embodiment.

FIG. 12 is a diagram illustrating a configuration of a main portion of the liquid discharge device according to a variation of the second embodiment. In the liquid discharge device 1A illustrated in FIG. 12, the robot arm 100 may be located by the controller 140 so that the holding portion 101 faces upward, and the head 8 held by the holding portion 101 may be fixed to the holding portion 101 using the second fixing members 32 directed downward from the top side of the head 8. By locating the robot arm 100 and fixing the head 8 in this manner, for example, a load associated with the mass of the head 8 or the second fixing members 32 is easily transmitted to the holding portion 101, and for example, workability is improved.

Assembly Method for Liquid Discharge Device

Figure 13:
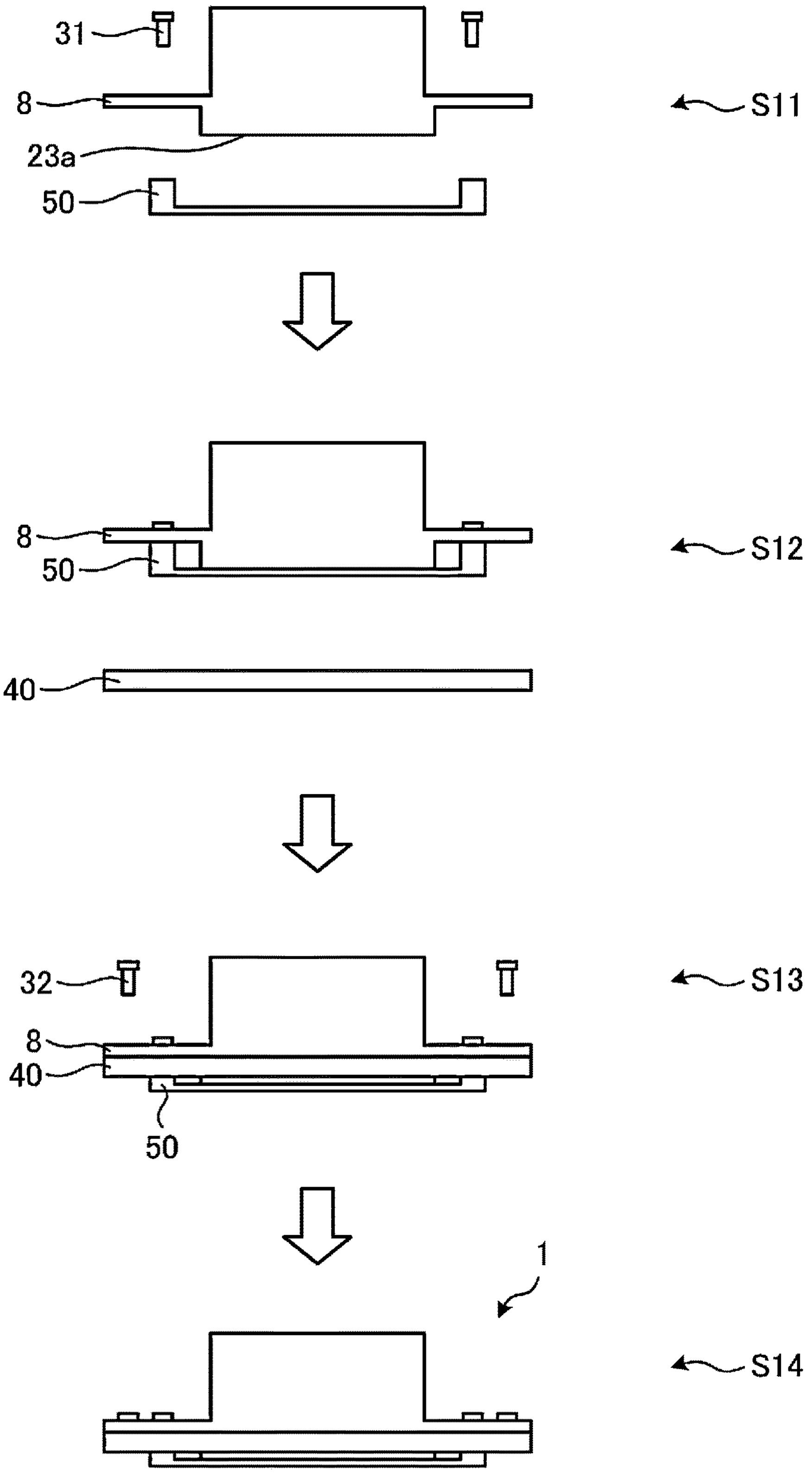
FIG. 13 is a diagram illustrating an example of an assembly method of the liquid discharge device according to the first embodiment.

FIG. 13 is a diagram illustrating an example of an assembly method of the liquid discharge device according to the first embodiment. First, the cap 50 that covers the first surface 23*a* of the head 8 is mounted using the detachable first fixing members 31 (step S11). The first fixing members 31 are provided along the thickness direction of the head 8. The first fixing members 31 may be provided from above the head 8 toward the lower side as illustrated, or may be provided from below the cap 50 toward the upper side.

The frame 40 is located below the head 8 to which the cap 50 is mounted (step S12), and the head 8 and the frame 40 are fixed using the second fixing members 32 (step S13). The second fixing members 32 may be provided from above the head 8 toward the lower side as illustrated, or may be provided from below the cap 50 toward the upper side. Thus, the liquid discharge device 1 to which the removable cap 50 is attached is completed (step S14).

Figure 14:
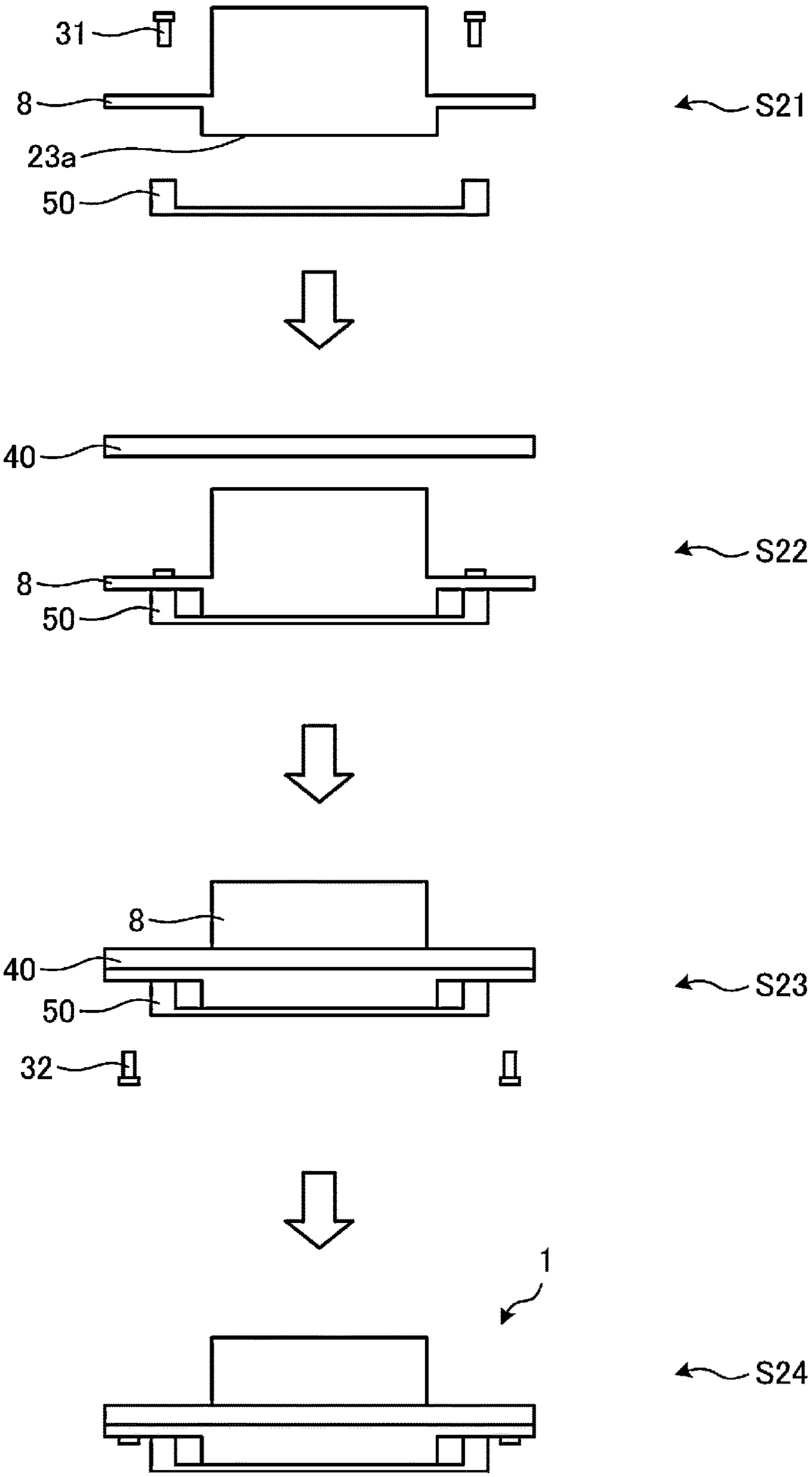
FIG. 14 is a diagram illustrating an example of an assembly method of the liquid discharge device according to a variation of the first embodiment.

FIG. 14 is a diagram illustrating an example of an assembly method of the liquid discharge device according to a variation of the first embodiment. First, the cap 50 that covers the first surface 23*a* of the head 8 is mounted using the detachable first fixing members 31 (step S21). This step S21 is same as, and/or similar to the step S11 described above.

The frame 40 is located above the head 8 to which the cap 50 is mounted (step S22), and the head 8 and the frame 40 are fixed using the second fixing members 32 (step S23). The second fixing members 32 may be provided from below the cap 50 toward the upper side as illustrated, or may be provided from above the head 8 toward the lower side. Thus, the liquid discharge device 1 to which the removable cap 50 is attached is completed (step S24).

Although each embodiment of the present disclosure has been described above, the present disclosure is not limited to the embodiments described above, and various changes can be made without departing from the spirit of the present disclosure. For example, the frame 40 or the casing 40A may be located as the holding portion 101 located at the tip of the robot arm 100 illustrated in FIG. 11 and/or FIG. 12.

As described above, the liquid discharge device 1 according to an embodiment includes the head 8, the holding portion, the cap 50, and the second fixing member 32. The head 8 includes the first surface 23*a* configured to discharge liquid. The holding portion holds the head 8. The cap 50 is fixed to the head 8 using the removable first fixing member 31 and covers the first surface 23*a*. The second fixing member 32 fixes the head 8 and the holding portion. Accordingly, the first surface 23*a* is protected by the cap 50 until the head 8 is used, thus improving reliability in assembling the liquid discharge device 1.

The first fixing member 31 and the second fixing member 32 according to an embodiment are both provided toward the same side along the thickness direction of the head 8. Accordingly, workability can be improved, and the first surface 23*a* is protected by the cap 50 until the head 8 is used, thus improving reliability in assembling the liquid discharge device 1.

The first fixing member 31 and the second fixing member 32 according to an embodiment are provided toward mutually opposite sides along the thickness direction of the head 8. Accordingly, workability can be improved, and the first surface 23*a* is protected by the cap 50 until the head 8 is used, thus improving reliability in assembling the liquid discharge device 1.

The first fixing member 31 according to an embodiment is provided so as to be removable from the holding portion in a direction in which the cap 50 is located. Accordingly, workability can be improved, and the first surface 23*a* is protected by the cap 50 until the head 8 is used, thus improving reliability in assembling the liquid discharge device 1.

The liquid discharge device 1A according to an embodiment includes the robot arm 100 in which the holding portion 101 is located at the tip thereof. Accordingly, also in the liquid discharge device 1A including the robot arm 100, the first surface 23*a* of the head 8 is protected by the cap 50 until the head 8 is used, thus improving reliability in assembling the liquid discharge device 1.

The head 8 according to an embodiment includes the nozzle plate 23 including the first surface 23*a* and the second surface 23*b* facing the first surface 23*a*, the channel member 24 located on the second surface 23*b* and including a plurality of reservoir plates layered in the thickness direction of the head 8, and the base plate 25 located on the side opposite to the nozzle plate 23 with the channel member 24 interposed therebetween and thicker than each of the reservoir plates. The base plate 25 has a first hole with which the first fixing member 31 is mounted and a second hole with which the second fixing member 32 is mounted. This increases the durability of the head 8.

The channel member 24 according to an embodiment includes the first penetrating portion separated from the second fixing member 32 at a position corresponding to the second hole. This increases the durability of the head 8 and can contribute to miniaturization of the head 8.

The cap 50 according to an embodiment includes the second penetrating portion separated from the second fixing member 32 at a position corresponding to the second hole. This can improve workability.

Further effects and variations can be readily derived by those skilled in the art. Thus, a wide variety of aspects of the present disclosure are not limited to the specific details and representative embodiments represented and described above. Accordingly, various changes are possible without departing from the spirit or scope of the general inventive concepts defined by the appended claims and their equivalents.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. An assembly method for a liquid discharge device, the assembly method comprising:

mounting a cap to a head that comprises a first surface configured to discharge liquid, the cap covering the first surface;

fixing the head to which the cap is mounted to a holding portion; and removing the cap from the head that is fixed to the holding portion, wherein the cap is fixed to the head using a first fixing member that is removable, the head is fixed to the holding portion using a second fixing member, the first fixing member and the second fixing member are provided toward the same side along a thickness direction of the head, and the first fixing member is removable in a direction away from the first surface.

2. The assembly method according to claim 1, wherein the head comprises:

a nozzle plate comprising the first surface and a second surface facing the first surface;

a channel member located on the second surface and comprising a plurality of reservoir plates layered in the thickness direction of the head; and a base plate located on a side opposite to the nozzle plate with the channel member interposed therebetween, the base plate having a thickness greater than a thickness of each reservoir plate of the plurality of reservoir plates, the base plate comprising a first hole with which the cap is removably mounted to the head using the first fixing member and a second hole with which the head is fixed to the holding portion using the second fixing member.

3. The assembly method according to claim 2, wherein the channel member comprises a first penetrating portion separated from the second fixing member at a position corresponding to the second hole.

4. The assembly method according to claim 3, wherein: the cap comprises a second penetrating portion separated from the second fixing member at a position corresponding to the second hole.

5. An assembly method for a liquid discharge device, the assembly method comprising:

mounting a cap to a head that comprises a first surface configured to discharge liquid, the cap covering the first surface;

fixing the head to which the cap is mounted to a holding portion;

removing the cap from the head that is fixed to the holding portion, wherein the liquid discharge device comprises a robot arm, and the holding portion is located at a tip of the robot arm;

locating the robot arm in a manner that the holding portion faces in a downward direction; and fixing the head to the holding portion to be located below the holding portion in the downward direction using a second fixing member that is directed in an upward direction from a side of the head.

6. An assembly method for a liquid discharge device, the assembly method comprising:

mounting a cap to a head that comprises a first surface configured to discharge liquid, the cap covering the first surface;

fixing the head to which the cap is mounted to a holding portion;

removing the cap from the head that is fixed to the holding portion, wherein the liquid discharge device comprises a robot arm, and the holding portion is located at a tip of the robot arm;

locating the robot arm in a manner that the holding portion faces in an upward direction; and fixing the head to the holding portion to be located above the holding portion in the upward direction using a second fixing member that is directed in a downward direction from a side of the head.

* * * * *